Patented Feb. 22, 1927.

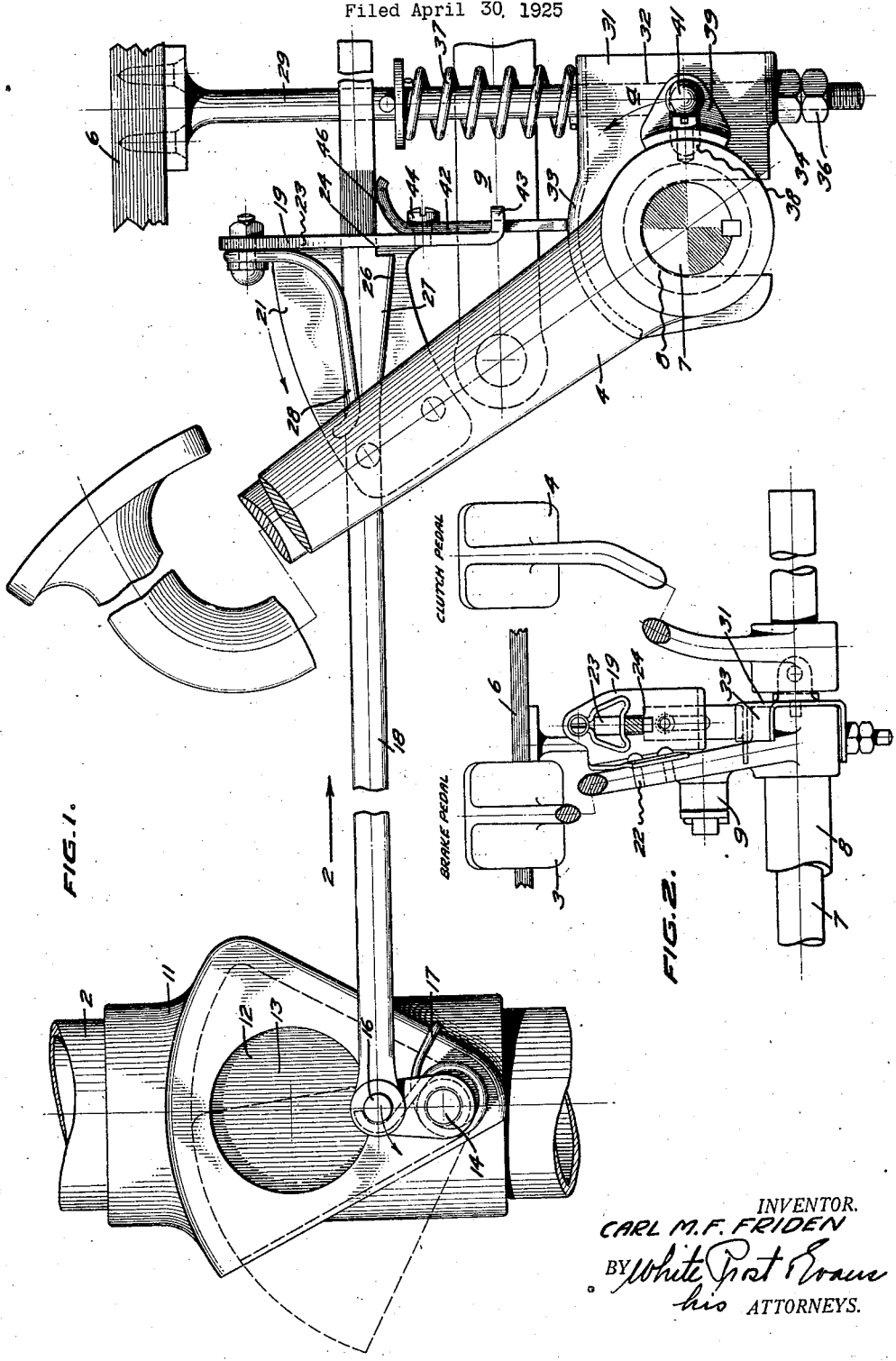

1,618,586

UNITED STATES PATENT OFFICE.

CARL M. F. FRIDEN, OF OAKLAND, CALIFORNIA.

MOTOR VEHICLE AND ENGINE CONTROL.

Application filed April 30, 1925. Serial No. 26,996.

My invention relates to vehicles driven by internal combustion motors and having running gear comprising a clutch, interposed between the engine and the driving wheels, and equipped with suitable brakes.

Motor vehicles of today, of the conventional type described, are provided with multi-cylinder, high compression engines, and in normal operation of the vehicle the engine is constantly consuming fuel regardless of whether the power produced in the engine is being transmitted through the running gear to drive the vehicle or being wasted while the vehicle is moving by its own momentum or being brought to a stop by means of the brakes.

It is an object of my invention to so relate the power demand on the engine to the operation of the vehicle that the engine will consume fuel only when driving power is required to keep the vehicle in motion, and that the compression of the motor, when not delivering driving power, may be employed with considerable effect as braking power to retard the movement of the vehicle.

Another object of the invention is to provide means for obtaining this control of the engine and vehicle, through operation of the ordinary operating levers of the vehicle.

Another object is to so connect the controlling means to the operating levers of the vehicle that no unusual manipulation of the operating levers is required to activate the controlling means.

Another object is to provide a controlling means of the character described that comprises but few parts, is readily adaptable to any modern motor vehicle and is cheap in construction and positive in operation.

The invention possesses other advantageous features, some of which with the foregoing, will be set forth at length in the following description where I shall outline in full that form of my invention which I have selected for illustration in the drawings accompanying and forming part of the present specification.

Referring to said drawings:

Figure 1 is a view in side elevation of fragments of the clutch and brake pedals of a motor vehicle and of the intake manifold of the engine, illustrating the assembled relation of my mechanism to these elements.

Fig. 2 is a fragmentary view in front elevation of the foot pedals, the direction in which the view is taken being indicated by the arrow in Fig. 1.

In the drawings, no attempt has been made to illustrate any elements of a motor vehicle other than those to which my mechanism is directly applied, as constructional details of modern vehicles are well known to those versed in the art. Thus a view of the engine, transmission, and brake mechanism is omitted as being unnecesary and confusing.

In accordance with my invention, I provide means operative by the depression of the brake pedal, for interrupting the flow of the combustible mixture through the inlet manifold to the engine, thus producing a saving in fuel and rendering the engine nonoperative to deliver power to the propeller shaft of the vehicle. When the supply of combustible mixture to the engine is interrupted, the engine is driven by the propeller shaft (when the vehicle is moving and the clutch is in engagement) so that the engine constitutes a load on the propeller shaft which tends to retard the movement of the vehicle. Means are also provided for rendering the means which interrupts the flow of the combustible mixture to the engine inoperative to interrupt such flow when the clutch pedal is depressed, so that the application of the brake, when the clutch is disengaged will not result in "killing" the engine. The means for interrupting the flow of combustible mixture to the engine preferably comprises a valve in the inlet manifold between the carbureter and the engine, which valve controls a larger opening in the inlet manifold, which when open establishes direct and free communication between the inlet manifold and the external atmosphere, when the valve is moved to uncover the opening, air flows directly into the manifold above the carbureter, thus minimizing or substantially precluding the passage of air through the carbureter. The air introduced into the engine tends to augment its natural braking effect.

The numeral 2 indicates a portion of the intake manifold of an internal combustion engine of a motor vehicle between the carbureter and the engine. The brake pedal is indicated by the numeral 3, the clutch pedal by the numeral 4, and the floor boards of the vehicle by the numeral 6. The clutch pedal 4 is secured to a shaft 7 by which movement of the pedal is transmitted to operate the clutch mechanism, and the brake pedal 3 is secured to a bearing tube 8 through which the shaft 7 projects. Movement of the brake pedal is transmitted to the brake mechanism thru a suitable connection such as indicated at 9. It will be understood that the brake mechanism is provided with the conventional spring for returning the parts to the inoperative position illustrated in the drawings, when pressure on the brake pedal is released.

The only alteration of the elements of the vehicle which is necessary in applying my mechanism is, that a section must be removed from the intake manifold of the engine and the severed ends of the manifold be secured in opposite ends of a valve housing 11. The valve housing is provided with an opening 12 adapted to be normally closed by a shutter or gate 13 arranged in a slot in the housing and pivoted on a shaft 14. A crank lever and pin 16 are mounted on the shaft and a spring 17 is arranged between the valve housing and the pin to resiliently retain the gate 13 in closed position.

The valve is adapted to be operated under certain conditions, by movement of the brake pedal 3, and a valve operating rod 18, pivoted at one end to the pin 16, is provided for that purpose.

Secured to the brake pedal 3 and preferably arranged between it and the clutch pedal beneath the floor boards of the vehicle, is a latch plate 19. The latch plate illustrated is vertically disposed in a plane parallel with the axis of the clutch shaft 7 and brake pedal bearing tube 8, and is mounted on the brake pedal by means of an angular extension arm 21 and screws 22.

The latch plate is adapted to releasably engage the free end of the valve rod 18, to open the valve when the brake pedal is depressed.

Formed in the latch plate is a narrow vertically disposed slot 23 thru which the free end of the valve rod 18 is adapted to pass, the bottom lip 24 of the slot being adapted to engage a ratchet tooth 26 on the rod. The tooth 26 is formed on the bottom of the rod and is so disposed that when the rod is resting on the lip 24, a slight depression of the brake pedal will engage the lip with the tooth, and further movement of the pedal will be transmitted thru the rod to open the gate 13 of the valve 11. If, however, the rod is lifted in the slot to disengage the tooth from the lip the pedal may be fully depressed without actuating the valve as the rod will pass thru the slot in the latch plate. On the return of the latch plate to normal vertical position the lip 24 will slide along the bottom of the rod and along the tapered front face 27 of the tooth 26 until the plate has almost reached its vertical position when the rod and tooth will drop into position again, to be engaged by the lip 24 on the next movement of the brake.

A jack-knife type spring 28 is secured to the front of the latch plate above the slot 23 and is adapted to normally hold the rod down in the slot 23 with the tooth 26 ready for engagement with the lip 24.

It will thus be seen that with the elements of my device thus far described, in normal position as illustrated in the drawings, depression of the brake pedal will first move the associated latch plate against the tooth 26 taking up the gap necessary to insure their engagement. Further movement of the pedal while taking up the always present slack in the brake mechanism will act thru the latch plate and valve rod to open the gate valve 11, and complete depression of the pedal to actuate the brakes will fully open the valve. It follows then that a small opening of the valve, as would be effected with slight depression of the pedal, may be used to advantage when the vehicle is coasting on a slight grade, supplying sufficient auxiliary air to the combustion mixture being drawn thru the intake manifold from the carbureter, to decrease the consumption of fuel. Partial or full application of the brakes however, will open the valve sufficiently to relieve the suction on the carbureter thus cutting off the supply of fuel while scavenging the engine with cool air. Driving power is thus cut off and instead the engine will act as an effective brake, due to compression of the air in the cylinders as the engine is driven thru the running gear from the driving wheels.

It will be obvious that if the engine be disconnected from the driving wheels by operation of the clutch while the brake pedal is depressed and the gate valve 11 open, the engine will immediately stop. This condition would be highly undesirable in the operation of the vehicle, and to prevent such an effect I have provided the following mechanism associated with that before described.

Mounted for vertical movement on a guide 29 preferably secured to the floor boards 6 of the vehicle, is a cam plate 31. This plate may be arranged between the clutch and brake pedals and comprises a vertical side 32, perpendicular to the axis of the pedals, an arcuate lifting face 33 bent at right angles to the side 32 with the arc lying in a plane parallel to the side, and a guide ear 34 also bent at right angles to the side and vertically spaced from the arcuate lifting face. Holes are provided in vertical alignment at the rear of the lifting face and in the ear 34, by which the cam plate may be mounted on the rod 29. Nuts 36, threadably secured at the bottom of the rod, limit the downward movement of the cam plate, and a spring 37 arranged on the rod and acting on the rear of the lifting face normally retains the plate against the stop nuts 36.

Formed in the side 32 of the cam plate, which it will be remembered lies in a plane perpendicular to the axis of the pedals, is a horizontal slot 38. Secured to the clutch pedal 4 adjacent and behind its axis 7, is a lug 39, having a pin 41 mounted thereon adapted to project thru the slot 38. Movement of the clutch pedal will therefore cause the lug and pin 41 secured thereto to move in the direction of the arrow $a$ and as the pin 41 projects thru the horizontal slot 38 in the cam plate, will lift the cam plate on its guide 29 against the compression of spring 37.

This cam plate with its arcuate lifting face 33 is provided to change the arcuate movement of the clutch pedal when being depressed to release the clutch, to a vertical movement adapted thru the following mechanism to disable the connection of the valve 11 with the brake pedal 3, thus allowing the brakes of the vehicle to be applied while the clutch is disengaged without danger of "killing" the engine. Slidably mounted on the rear of the latch plate in a guide lip 43 is a latch 42 limited in vertical movement by a headed guide pin 44 projecting thru a slot formed in the latch and secured in the back of the latch plate. The latch 42 at its upper end is provided with a curved portion 46 adapted to engage the under side of the free end of the valve rod 18 projecting thru the slot 23 formed in the latch plate. The opposite end of the latch rests against the arcuate lifting face 33 of the cam plate 31.

The arcuate lifting face 33 is concentric with the axis of the clutch and brake pedals, and is thus formed so that a fixed distance is maintained between the latch plate, with its latch 42, and the lifting face 33 of the cam plate, regardless of movement of the brake pedal to which the latch plate is fixed; unless the clutch pedal be depressed. When this occurs the cam plate will be lifted, correspondingly moving the latch and disengaging the tooth 26 of the valve rod from the lip 24 of the latch plate. It will be obvious that under all other conditions, the toothed rod 18 being pivoted to the gate pin 16, will be held in engagement with the latch plate by the jack-knife spring 28 for movement with the brake pedal and corresponding opening of the gate valve.

I claim:

1. The combination with an internal combustion engine driven vehicle provided with brakes, the engine being provided with an intake having means for supplying a combustible mixture thereto, of means operative upon the application of the brakes for introducing excess air into the engine intake.

2. The combination with an internal combustion engine driven vehicle provided with brakes, a carburetor and an inlet manifold, a valve in the inlet manifold controlling the flow of air through the carburetor and means operative by the application of the brakes for moving the valve to interrupt the flow of air through the carburetor.

3. The combination with an internal combustion engine driven vehicle provided with brakes, a carburetor and an inlet manifold, said manifold having an opening therein above the carburetor through which air may directly enter the manifold, the opening being of such size that when open sufficient air directly enters the manifold to cause a non-combustible mixture to be introduced into the engine, a valve normally closing said opening and means connecting the valve and the brakes, whereby the application of the brakes moves the valve to uncover the opening.

4. The combination with an internal combustion engine driven vehicle provided with brakes and with a clutch between the engine and the running gear and means for supplying a combustible mixture to the engine, of means operative by the application of the brakes for interrupting the flow of the mixture to the engine and means operated by the disengagement of the clutch for rendering said brake operated means inoperative.

5. The combination with an internal combustion engine driven vehicle provided with brakes, a power transmission clutch and means for supplying a combustible mixture to the engine, a pedal for actuating said brakes, means operative by the depression of the pedal for interrupting the flow of the mixture to the engine, a pedal for actuating the clutch and means operated by the depression of the clutch pedal for disengaging the interrupting means from the brake pedal.

6. The combination with an internal combustion engine driven vehicle provided with brakes, a pedal for operating said brakes, a carburetor and an intake manifold having a lateral opening therein above the carbureter, of a valve normally closing said opening, and means connecting said valve with the brake pedal whereby depression of the pedal moves the valve to uncover the opening.

7. The combination with an internal combustion engine driven vehicle having a brake pedal and means for supplying a combustible mixture to the engine, of means operative by the depression of the brake pedal for diluting said mixture with air to a sufficient extent to render it non-combustible in the engine.

8. The combination with an internal combustion engine driven vehicle having a brake pedal, a clutch pedal and means for supplying a combustible mixture to the engine, of means operable to cause a dilution of the combustible mixture with air to render it non-combustible in the engine, an operative member connecting said means with the brake pedal and means operative by depression of the clutch pedal for disengaging the operative member from the brake pedal.

9. The combination with a motor driven vehicle having a clutch and a separate brake, of a valve, and means governed by the manipulation of said clutch and brake for operating said valve.

10. The combination with a motor driven vehicle having a clutch and a brake, of a valve, means governed by the manipulation of the brake for operating the valve, and means governed by the manipulation of the clutch for disabling said brake governed valve operating means.

11. The combination with a motor driven vehicle having a clutch and means for operating the clutch, a brake and means for operating the brake, of a valve, and means for operating said valve governed by the relative manipulation of said clutch operating means and said brake operating means.

12. The combination with a vehicle having running gear, an internal combustion engine for driving the running gear, said engine having an inlet manifold, a clutch interposed between the engine and the running gear, means for operating the clutch, a brake associated with the running gear, and means for operating the brake, of a valve in said inlet manifold, a rod for operating said valve, a plate mounted on said brake operating means engageable with said rod and means operable by said clutch operating means for disengaging said rod from said plate.

13. The combination with a vehicle having running gear, an internal combustion engine for driving the running gear, said engine having an inlet manifold, a clutch interposed between the engine and the running gear, means for operating the clutch, a brake associated with the running gear, and means for operating the brake, of a valve in said inlet manifold, a rod for operating said valve, a plate mounted on said brake operating means engageable with said rod, a latch mounted on said plate adapted to disengage said rod from said plate and means operable by the clutch operating means for actuating said latch.

14. The combination with a vehicle having running gear, an internal combustion engine for driving the running gear, said engine having an inlet manifold, a clutch interposed between the engine and the running gear, means for operating the clutch, a brake associated with the running gear, and means for operating the brake, of a valve in said inlet manifold, a toothed rod for operating said valve, a plate mounted on the brake operating means, a slot having a lip formed in said plate thru which said toothed rod may pass, resilient means for engaging said toothed rod with said lip and a latch operable by the clutch operating means and mounted on said plate for disengaging said toothed rod from said lip.

15. The combination with a vehicle having running gear, an internal combustion engine for driving the running gear, said engine having an inlet manifold, a clutch interposed between the engine and the running gear, means for operating the clutch, a brake associated with the running gear, and means for operating the brake, of a valve in said inlet manifold, a toothed rod for operating said valve, a plate mounted on the brake operating means, a slot having a lip formed in said plate thru which said toothed rod may pass, resilient means for engaging said toothed rod with said lip, a latch mounted on said plate for disengaging said toothed rod from said lip and cam means operable by the clutch operating means for actuating said latch.

16. The combination with a vehicle having running gear, an internal combustion engine for driving the running gear, said engine having an inlet manifold, a clutch interposed between the engine and the running gear, means for operating the clutch, a brake associated with the running gear, and means for operating the brake, of a valve in said inlet manifold, a toothed rod for operating said valve, a plate mounted on the brake operating means, a slot having a lip formed in said plate thru which said toothed rod may pass, resilient means for engaging said toothed rod with said lip, a latch mounted on said plate, a cam plate having an arcuate face adapted to engage said latch and means whereby movement of the clutch operating means will cause the arcuate face of said cam plate to engage said latch.

17. The combination with a vehicle having running gear, an internal combustion engine for driving the running gear, said engine having an inlet manifold, a clutch interposed between the engine and the running gear, means for operating the clutch, a brake associated with the running gear, and means for operating the brake, of a valve in said inlet manifold, and means associated with the clutch operating means and the brake operating means whereby initiation of braking effort will cause actuation of the valve to relieve the vacuum produced in the intake manifold by the motor and initiation of operation of the clutch will cause the valve to close and render the means associated with the clutch and brake operating means inactive.

18. The combination with a vehicle having running gear, an internal combustion engine for driving the running gear, said engine having an inlet manifold, a clutch interposed between the engine and the running gear, means for operating the clutch, a brake associated with the running gear, and means for operating the brake, of a valve in said inlet manifold, and means associated with the clutch operating means and the brake operating means whereby initiation of braking effort will cause actuation of the valve to starve the motor and initiation of operation of the clutch will cause the valve to close and render the means associated with the clutch and brake operating means inactive.

19. The combination with a vehicle having running gear, an internal combustion engine for driving the running gear, said engine having an inlet manifold and a carbureter associated with said manifold, a clutch interposed between the engine and the running gear, means for operating the clutch, a brake associated with the running gear, and means for operating the brake, of a valve interposed between the engine and the carbureter in the inlet manifold and means associated with the clutch and brake operating means whereby initiation of braking action will open said valve to render the carbureter inactive and initiation of operation of the clutch will close said valve and render the means associated with the clutch and brake operating means inoperative until clutch operation ceases.

20. The combination with a vehicle having running gear, an internal combustion engine for driving the running gear, said engine having an inlet manifold and a carbureter associated with said manifold, a clutch interposed between the engine and the running gear, means for operating the clutch, a brake associated with the running gear, and means for operating the brake, of a valve interposed between the engine and the carbureter in the inlet manifold, a spring for holding said valve normally closed, a toothed rod for opening said valve, a plate mounted on the brake operating means, resilient means for normally holding the toothed rod in engagement with the plate, a latch adapted to disengage said rod and plate and means operable in synchronism with the clutch operating means for actuating said latch.

21. The combination with a vehicle having running gear, an internal combustion engine for driving the running gear, said engine having an inlet manifold and a carbureter associated with said manifold, a clutch interposed between the engine and the running gear, means for operating the clutch, a brake associated with the running gear, and means for operating the brake, of a valve interposed between the engine and the carbureter in the inlet manifold, a spring for holding said valve normally closed, a toothed rod for opening said valve, a slotted plate having a lip mounted on the brake operating means and thru which the rod may pass, a spring on said plate for normally holding said toothed rod in engagement with said lip, a latch mounted on said slotted plate and adapted to disengage said rod from said lip, a cam plate having an arcuate face adapted to engage said latch and adapted to move vertically on a guide, a slot in said cam plate perpendicular to said arcuate face and a pin mounted on the clutch operating means and engaged in said slot in said cam plate.

22. The combination with a motor driven vehicle, a brake for the tractive elements of said vehicle, and means operable upon the application of said brake to augment the natural braking effect of said motor.

23. The combination with a motor driven vehicle, a brake for the tractive elements of said vehicle, means operable upon the application of said brake to augment the natural braking effect of said motor, and means operable upon the disengagement of said motor from the tractive elements of the vehicle for rendering said first mentioned means inoperative.

24. The combination with a motor driven vehicle, of valve means for controlling the supply of fuel to said motor, means for manually controlling said valve means, a clutch operating member and means controlled by the movement of said member for rendering said manual controlling means inoperative.

25. The combination with a motor vehicle, of valve means for controlling the supply of fuel to said motor, means for manually controlling said valve means, manually operable means for disengaging said motor from the tractive elements of said vehicle, and means controlled by the movement of said disengaging means for rendering said manual controlling means inoperable.

26. In combination with a motor vehicle driven by an internal combustion engine, an intake manifold for said engine, a carburetor connected to said intake manifold, a relatively large opening in said intake manifold between said carburetor and engine, valve means for regulating the passage of air thru said opening from the atmosphere, and manual operable means for controlling said valve whereby substantial quantities of air may be introduced into said intake to interrupt the flow of fuel from said carburetor and to augment the natural braking effect of said engine.

In testimony whereof, I have hereunto set my hand.

CARL M. F. FRIDEN.